United States Patent [19]

Matsumoto et al.

[11] Patent Number: 5,292,200
[45] Date of Patent: Mar. 8, 1994

[54] BALL-AND-ROLLER BEARING

[75] Inventors: Yoichi Matsumoto; Kenji Yamamura; Kousuke Nonaka, all of Kanagawa, Japan

[73] Assignee: NSK Ltd., Tokyo, Japan

[21] Appl. No.: 82,169

[22] Filed: Jun. 28, 1993

Related U.S. Application Data

[63] Continuation of Ser. No. 928,304, Aug. 12, 1992, abandoned.

[30] Foreign Application Priority Data

Aug. 14, 1991 [JP] Japan .................. 3-204275

[51] Int. Cl.$^5$ .............................................. F16C 33/62
[52] U.S. Cl. ..................................... 384/492; 384/568; 384/569; 384/625; 384/912; 384/913; 420/47
[58] Field of Search ............... 384/492, 625, 912, 913, 384/569, 548; 420/47

[56] References Cited

U.S. PATENT DOCUMENTS

| | | | |
|---|---|---|---|
| 4,183,774 | 1/1980 | Balleret | 420/47 |
| 5,030,017 | 7/1991 | Murakami et al. | 384/625 |
| 5,122,000 | 6/1992 | Matsumoto et al. | 384/913 |
| 5,147,140 | 9/1992 | Murakami et al. | 384/492 |

FOREIGN PATENT DOCUMENTS

| | | |
|---|---|---|
| 56-55565 | 5/1981 | Japan . |
| 64-55423 | 3/1989 | Japan . |
| 1205063 | 8/1989 | Japan . |

*Primary Examiner*—Lenard A. Footland
*Attorney, Agent, or Firm*—Sughrue, Mion, Zinn, Macpeak & Seas

[57] ABSTRACT

At least one of the inner race, the outer race and rolling elements in the improved ball-and-roller bearing is made of an alloy steel that contains 0.1–1.2 wt % of C, 3.0–18.0 wt % of Cr, 0.01–1.5 wt % of Si, 0.3–1.5 wt % of Mn, up to 2.5 wt % of Mo, up to 0.002 wt % of $O_2$ and up to 0.015 wt % of S and which is subjected to plasma-assisted carburization to such an extent that the relative surface carbon area is at least 15% the surface carbon concentration is in the range of 1.6–3.5 wt % and the amount of surface retained austenite is in the rang of 20 vol %–45 vol %. The bearing can work effectively for a prolonged lifetime even if it is placed under hostile conditions as exemplified by an increased areal pressure of load and entrance of foreign matter into lubricating oils.

6 Claims, 7 Drawing Sheets

BALL-AND-ROLLER BEARING

This is a continuation of application Ser. No. 07/928,304 filed Aug. 12, 1992, abandoned.

BACKGROUND OF THE INVENTION

This invention relates to a ball-and-roller bearing and, more particularly, to an improvement in the life of ball-and-roller bearings that are to be used in transmissions and engines in automobiles, agricultural machines, construction machines and iron- and steel-making machines.

Various alloy steels are conventionally used in ball-and-roller bearings and dominant among them are low-alloy steels including SUJ 2, or bearing steel type 2 according to the JIS.

The environment of the use of bearings has recently become increasing hostile for various reasons such as the increase in the areal pressure of load due to the downsizing of bearings and the entrance of foreign matter into lubricant oils.

While various methods have been proposed to extend the life of ball-and-roller bearings, the one that is described in Unexamined Published Japanese Patent Application No. 55423/1989 is characterized by increasing the amount of retained austenite in bearing steels so that even if indentations occur on the raceway surfaces or rolling contact surfaces due to the presence of foreign matter in lubricant oils, subsequent rolling contacts will increase the curvature of indentation edges to lessen the concentration of stresses at those edges, thereby improving the life of the ball-and-roller bearings made of those steels.

However, retained austenite which is capable of retarding the occurrence of cracking by lessening stresses that would otherwise develop at indentation edges or around nonmetallic inclusions has the disadvantage of poor fatigue resistance. Thus, in order to further extend the life of bearings, it is essential to improve the fatigue resistance of retained austenite. One method that can be adopted to retain the above-mentioned satisfactory characteristics of retained austenite and yet improve its fatigue resistance is to effect "precipitation hardening" by causing fine carbide crystals to be precipitated in the retained austenite. To this end, steels as base materials of bearings must be made not of low-alloy steels such as SCr 420 which is commonly used today but of high-alloy steels which, in addition to Cr (chromium), contain carbide-forming elements such as Mo (molybdenum); furthermore, it is necessary to carburize those high-alloy steels so that fine carbide crystals will be precipitated.

A method that adopts this approach is described in Unexamined Published Japanese Patent Application No. 55565/1981; a low-carbon high-chromium steel as a cold workable steel is carburized so that fine carbide crystals will be precipitated in retained austenite to improve the moldability of the steel while insuring that it will have wear resistance comparable to or even higher than that of high-carbon chromium steels such as SK 11.

The steel described in Unexamined Published Japanese Patent Application No. 55565/1981 has improved wear resistance but it has not been given any consideration about the requirements to be satisfied before the steel can be used as the base material of ball-and-roller bearings, nor has it been given any consideration about the appropriate range of the content of retained austenite.

A further problem with this prior art steel is that it is subjected to gas carburization in which carbon is mainly diffused inward of comparatively thin grain-boundary areas of the Cr oxide layer in the steel. Therefore, if the Cr content of the steel is increased to 3.0 wt % or more so that a Cr oxide layer will form on the surface of the steel, carbides will be concentrated locally at the grain boundaries of a phase which was initially austenite, thus making it impossible to produce a uniformly fine-grained carbide layer.

Unexamined Published Japanese Patent Application No. 205063/1989 discloses a wear-resistant stainless steel part that has been produced by performing plasma-assisted carburization on a low-carbon high-chromium steel; the part is characterized by the presence of a large amount of fine-grained carbides in the carburized layer, which contributes to higher wear resistance than in the case where gas carburization is effected. However, this prior art still lacks consideration about the requirements to be satisfied for applying the steel to ball-and-roller bearings, nor does it give any consideration about the appropriate range of the quantity of retained austenite or an improvement in the rolling fatigue life.

SUMMARY OF THE INVENTION

The present invention has been accomplished under these circumstances and has as an object providing a ball-and-roller bearing that can work effectively for a prolonged lifetime even if it is placed under hostile conditions as exemplified by an increased areal pressure of load and entrance of foreign matter into lubricating oils.

This object of the present invention can be attained by a ball-and-roller bearing that comprises an inner race, an outer race and rolling elements and which is characterized in that at least one of said inner race, said outer race and said rolling elements is made of an alloy steel that consists of 0.1–1.2 wt % of C, 3.0–18.0 wt % of Cr, 0.01–1.5 wt % of Si (silicon), 0.3–1.5 wt % of Mn (manganese), up to 2.5 wt % of Mo, up to 0.002 wt % of $O_2$ (oxygen), up to 0.015 wt % of S (sulfur) and the balance being iron and incidental impurities, said alloy steel being subjected to plasma-assisted carburization and hardened to such an extent that it has a relative surface carbon area of at least 15%, a surface carbon concentration of 1.6–3.5 wt % and a surface retained austenite level $[\gamma_R]_{sur}$ of 20–45 vol %.

According to the present invention, the elements to be contained in the alloy steel to be carburized, as well as their concentrations (contents) are limited; further, said alloy steel is subjected to plasma-assisted carburization; in addition, the surface carbon concentration, the relative surface carbide area and the content of surface retained austenite are limited as set forth above; if these conditions are met, the retained austenitic phase can be precipitation hardened. As a result, the ability of the retained austenitic phase to lessen stress concentration is retained and yet its resistance to crack propagation and fatigue can be improved.

DETAILED DESCRIPTION OF THE INVENTION

Figure 1:
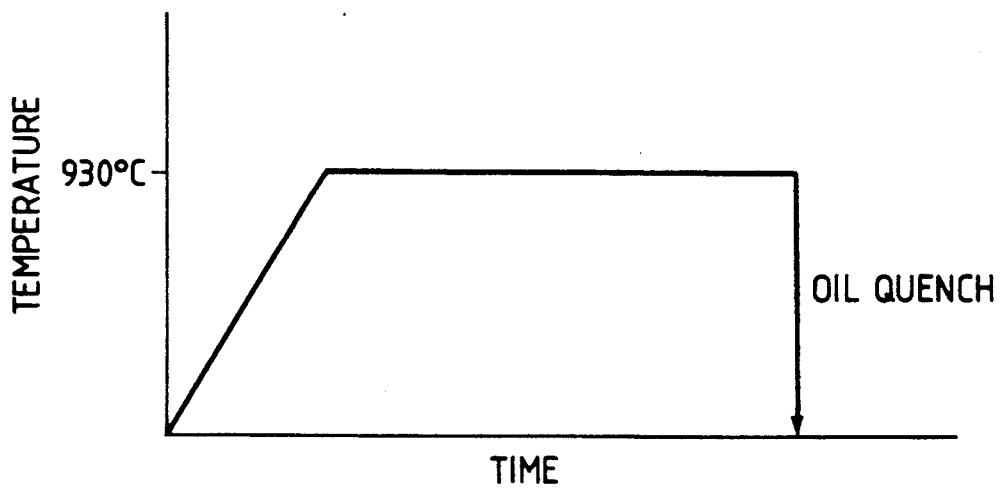
FIG. 1 is a diagram showing the temperature vs time profile of plasma-assisted carburization that was performed in the examples of the present invention.

On the pages that follow, the technical rationale of the respective conditions recited in claim 1, as well as the criticality of the numerical limitations associated with those conditions are described in detail.

Plasma-assisted carburization

Precipitation hardening of the retained austenite can be accomplished by causing uniform and fine-grained carbides to be precipitated in the retained austenite.

The hydrogen ($H^+$) ions in a plasma atmosphere have a reducing effect; therefore, even if the Cr concentration of the steel to be carburized exceeds 3.0 wt %, plasma-assisted carburization can be performed while $O_2$ in the Cr oxide present on the surface of the steel is removed to prevent the formation of a Cr oxide layer on that surface. Hence, carbon (C) will be diffused uniformly from the surface of the steel to the interior without passing through the grain boundaries of what was initially an austenitic phase. As a result, a uniform and fine-grained carbide layer can be produced, thereby enabling satisfactory precipitation hardening of the retained austenitic lo phase.

In rolling contact, a maximum shear stress develops not on the rolling contact surface (the outermost surface) of rolling elements but a certain distance beneath that rolling contact surface. Therefore, in order to extend the fatigue life of a ball-and-roller bearing under rolling, the fatigue resistance of that inner portion of the bearing must be improved.

In plasma-assisted carburization, C is converted to $C^+$ ions, which are then implanted electrically into the surface of the steel and, hence, the content of carbon in that steel surface can be increased right after the start of carburization. Thus, compared to gas carburization, carbon can be diffused from the surface of the steel inwardly to a deeper position. As a result, a carburized layer can be formed extending from the surface to a deeper area, thereby improving the fatigue resistance of the steel in the area where a maximum shear stress is to occur.

For the reasons set forth above, the method of carburization to be performed on the alloy steel which is the base material of the ball-and-roller bearing of the present invention is limited to plasma-assisted carburization.

$$3.0 \text{ wt \%} \leq Cr \leq 18.0 \text{ wt \%}$$

Chromium (Cr) is a carbide-forming element and adding more of it in the alloy steel to be carburized is important for precipitation hardening the retained austenitic phase. The precipitation hardening of the retained austenitic phase by the method of plasma-assisted carburization described above proves to be more effective than gas carburization if the concentration of Cr in the alloy steel to be carburized is at least 3.0 wt %. If the Cr concentration is less than 3.0 wt %, the inherent ability of plasma-assisted carburization to precipitation harden the retained austenitic phase will not be fully exhibited and the merit over gas carburization will decrease.

If the content of Cr in the alloy steel to be carburized exceeds 18.0 wt %, the diffusion rate of C will slow down, making it impossible to achieve the necessary depth of carburization.

For these reasons, the concentration of Cr in the alloy steel to be carburized is limited to lie within the rang of 3.0–18.0 wt %.

$$0.01 \text{ wt \%} \leq Si \leq 1.5 \text{ wt \%}$$

Silicon (Si) is not only a deoxidizer; it also is capable of stabilizing the retained austenitic phase chemically. The effectiveness of Si as a deoxidizer is fully exhibited if its concentration in the alloy steel to be carburized is at least 0.01 wt %. Adding 0.15 wt % or more of Si is effective in achieving greater chemical stability of the retained austenitic phase.

If the Si concentration of the alloy steel to be carburized exceeds 1.5 wt %, the rate of carburization will slow down, making it impossible to achieve the necessary depth of carburization.

For these reasons, the concentration of Si in the alloy steel to be carburized is limited to lie within the range of 0.01–1.5 wt %.

$$0.1 \text{ wt \%} \leq C \leq 1.2 \text{ wt \%}$$

Carbon (C) is an important factor that determines the cleanness of steels. If the concentration of C in the alloy steel to be carburized is less than 0.1 wt %, it is impossible to insure that the concentration of $O_2$ in that steel is held at no more than 0.002 wt % and this contributes to a shorter rolling fatigue life.

If the concentration of C in the alloy steel to be carburized exceeds 1.2 wt %, the steel as it solidifies will form coarse carbide crystals that are a starting point for rolling fatigue.

For these reasons, the concentration of C in the alloy steel to be carburized is limited to lie within the range of 0.1–1.2 wt %.

$$0.3 \text{ wt \%} \leq Mn \leq 1.5 \text{ wt \%}$$

Manganese (Mn) is capable of not only stabilizing the retained austenitic phase chemically but also providing improved resistance to rolling fatigue. If the concentration of Mn in the alloy steel to be carburized is less than 0.3 wt %, these effects of Mn cannot be fully exhibited.

If the concentration of Mn in the alloy steel exceeds 1.5 wt %, its hot workability is deteriorated.

For these reasons, the concentration of Mn in the alloy steel to be carburized is limited to lie within the range of 0.3-1.5 wt %.

$Mo \leq 2.5$ wt %

Molybdenum (Mo) is not only a carbide-forming element; it also promotes the refining of carbides. If the concentration of Mo in the alloy steel to be carburized exceeds 2.5 wt %, Mo will be segregated at grain boundaries. Hence, even if the steel is subjected to plasma-assisted carburization, carbides will be locally concentrated at the grain boundaries where Mo is segregated, thus making it impossible to yield a uniform fine-grained carbide layer.

For these reasons, the concentration of Mo in the alloy steel to be carburized is limited not to exceed 2.5 wt %.

Since Mo is more expensive than Cr, its use should be minimized from an economic viewpoint; however, in order to insure that Mo will work effectively in promoting the refining of carbides, it is advantageously added in an amount of at least 5/100 of the Cr concentration. Thus, in order to insure that the ability of Mo to promote the refining of carbides is fully exhibited while yielding a uniform fine-grained carbide layer, the Mo concentration is advantageously set to lie within the range of from $(Cr \times 5/100)$ wt % to 2.5 wt %.

$O_2 \leq 0.002$ wt %

Oxygen ($O_2$) will bind with Al (aluminum) in the alloy steel to be carburized, thereby shortening its fatigue life under rolling. Under the circumstances, the concentration of $O_2$ in the alloy steel to be carburized should be minimized. If the concentration of $O_2$ in the alloy steel to be carburized exceeds 0.002 wt %, the fatigue life of the steel under rolling is considerably shortened. For this reason, the concentration of $O_2$ in the alloy steel to be carburized is limited not to exceed 0.002 wt %.

$S \leq 0.015$ wt %

Like $O_2$, sulfur (S) also binds with Al in the alloy steel to be carburized, thereby shortening its fatigue life under rolling. Under the circumstances, the concentration of S in the alloy steel to be carburized should be minimized. If the concentration of S in the alloy steel to be carburized exceeds 0.015 wt %, the fatigue life of the steel under rolling is considerably shortened. For this reason, the concentration of S in the alloy steel to be carburized is limited not to exceed 0.015 wt %.

Relative surface carbide area: 15%-45%

The relative surface carbide area is another important factor for the purpose of precipitation hardening the retained austenitic phase. If the relative surface carbide area of the carburized alloy steel is less than 15%, it is difficult to fully precipitation harden the retained austenitic phase. If the relative surface carbide area of the carburized alloy steel is more than 45%, a mechanical strength is lowered. For this reason, the relative surface carbide area of the carburized alloy steel is limited to lie within the range of 15-45%. The relative surface carbide area of the carburized alloy steel is preferably in the range of 15-30%.

Surface carbon concentration: 1.5 wt %-3.5 wt %

As mentioned in the preceding paragraph, the relative surface carbide area of the carburized alloy steel must be at least 15% in order to insure that the retained austenitic phase is fully precipitation hardened. Even if the Cr concentration of the alloy steel to be carburized is at the lower limit 3.0 wt %, the surface carbon concentration must be at least 1.6 wt % to insure that the carburized alloy steel has a relative surface carbide area of at least 15%.

Plasma-assisted carburization has the advantage of easily increasing the surface carbon concentration of the carburized alloy steel; on the other hand, if carburization is performed to such an extent that the surface carbon concentration exceeds 3.5 wt %, the furnace bed will experience so heavy sooting that the productivity of the carburization process will decrease.

For these reasons, the surface carbon concentration of the carburized alloy steel is limited to lie within the range of 1.6-3.5 wt %.

Content of surface retained austenite $[\gamma_R]_{sur}$: 20 vol %-45 vol %

The retained austenite is usually soft and if it is allowed to be present in a desired proportion on the surface layer, the concentration of stresses at indentation edges can be lessened. Stated more specifically, even if indentations develop on the raceway surfaces or rolling contact surfaces on account of the entrance of foreign matter into lubrication oils, the curvature of the indentation edges can be sufficiently increased by subsequent rolling contacts to lessen the stress concentration, thereby retarding the occurrence of cracking at the indentation edges. This is the mechanism by which the retained austenitic phase proves effective in improving the fatigue life of the bearing steel under rolling.

If the content of surface retained austenite $[\gamma_R]_{sur}$ in the carburized steel is less than 20 vol %, the above-mentioned effect of the retained austenite cannot be fully exhibited.

As the content of surface retained austenite $[\gamma_R]_{sur}$ increases, the fatigue life of the steel under rolling will also improve. This effect is saturated if the content of retained austenite $[\gamma_R]_{sur}$ exceeds 45 vol %. Hence, even if the content of retained austenite $[\gamma_R]_{sur}$ is increased beyond the upper limit, the surface hardness of the steel will decrease rather than increase, which simply results in a lower fatigue life under rolling.

For these reasons, the content of surface retained austenite $[\gamma_R]_{sur}$ in the carburized steel is limited to lie within the range of 20 vol % to 45 vol %.

While the technical rationale of the respective conditions recited in claim 1, as well as the criticality of the numerical limitations associated with those conditions have been described above, it should be noted that those conditions suffice to be satisfied by at least one of the inner race, the outer race and the rolling elements in the bearing of the present invention.

As already mentioned, a maximum value of shear stress due to rolling contact develops not on the rolling contact surface (the outermost surface) of rolling elements but a certain distance beneath that rolling contact surface and, in an extreme case, the area where a maximum shear stress develops can be as deep as 2% of the diameter of rolling elements. Therefore, it is necessary to insure that the bearing will have a satisfactory fatigue life under rolling even in a position that corresponds to 2% of the diameter of rolling elements as measured from the rolling contact surface. To this end, it is advantageous for the carburized alloy steel to have a relative surface carbide area of at least 15% and a retained austenite content $[\gamma_R]_{sur}$ of 20–45 vol % in the position that corresponds to 2% of the diameter of rolling elements as measured from the rolling contact surface.

It should also be noted that the shear stress developing as a result of rolling contact will work substantially in an area that is shallower than a position corresponding to 4% of the diameter of rolling elements as measured from the rolling contact surface. Hence, it is necessary to improve the fatigue life of that area under rolling and, to this end, it is advantageous for that area to have a Rockwell hardness (HRC) of at least 58.

The following examples are provided for the purpose of further illustrating the present invention but are in no way to be taken as limiting.

EXAMPLE 1

Figure 2:
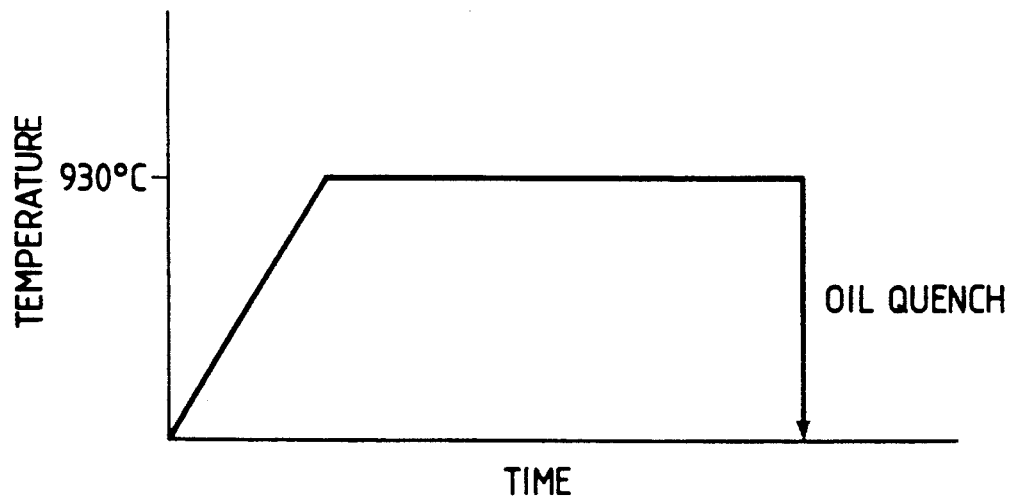
FIG. 2 is a diagram showing the temperature vs time profile of gas carburization that was performed in the examples of the present invention.

Two test pieces were prepared from an alloy steel (steel sample No. 1) having the chemical composition shown in Table 1 and they were carburized by two different methods, one being plasma-assisted carburization (for its process scheme, see FIG. 1) and the other being gas carburization (for its process scheme, see FIG. 2). More specific process conditions of the two methods are shown below.

| Plasma-assisted carburization | |
| --- | --- |
| Pressure in furnace: | 1.5 Torr |
| Carburizing gases: | $C_3H_8 + H_2$ ($C_3H_8$ to $H_2$ flow ratio controlled at 2:8) |
| Carburizing temperature: | 930° C. |
| Carburizing time: | 8 h |
| Plasma current: | 1 A |
| Plasma voltage: | 250 V |

| Gas carburization | |
| --- | --- |
| Pressure in furnace: | 760 Torr |
| Carburizing gases: | Rx gas + $C_3H_8$ (at controlled $CO_2$ concentration) |
| Carburizing temperature: | 930° C. |
| Carburizing time: | 8 h |

TABLE 1

| Steel No. | Chemical Composition (wt %) | | | | | | | |
| --- | --- | --- | --- | --- | --- | --- | --- | --- |
| | C | Si | Mn | P | S | Cr | Mo | O |
| 1 | 0.15 | 0.25 | 0.71 | 0.012 | 0.008 | 5.02 | 0.02 | 0.0013 |

Figure 3:
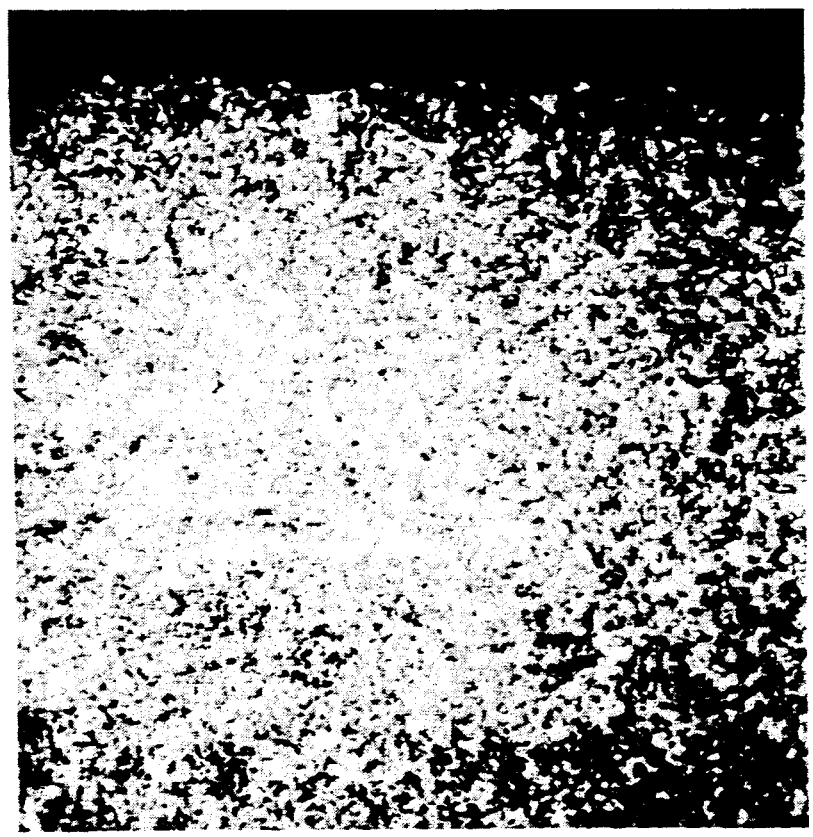
FIG. 3 is a photo showing the microscopic structure of a test piece that was subjected to plasma-assisted carburization in Example 1 of the present invention.
Figure 4:
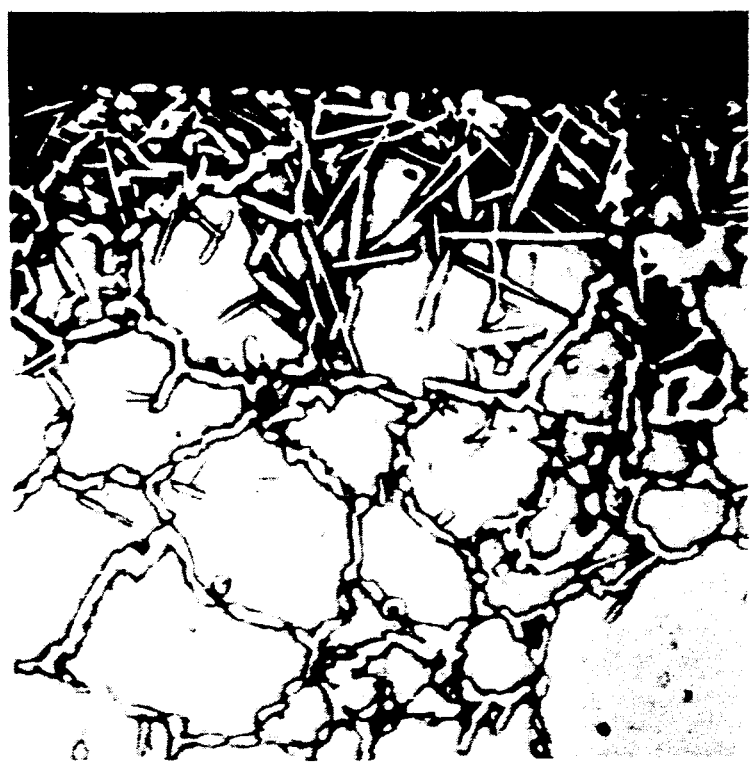
FIG. 4 is a photo showing the microscopic structure of a test piece that was subjected to gas carburization in Example 1 of the present invention.

FIG. 3 is a photo showing the microscopic structure of the test piece subjected to plasma-assisted carburization, and FIG. 4 is a photo showing the microscopic structure of the test piece subjected to gas carburization.

As one can see from FIG. 3, uniform and fine-grained carbides were precipitated and dispersed in the test piece subjected to plasma-assisted carburization. This may be explained as follows: in plasma-assisted carburization, the $H^+$ ions in a plasma atmosphere insure that carburization can be performed while $O_2$ in the Cr oxide present on the surface of the steel is removed to prevent the formation of a Cr oxide layer on that surface. Hence, C will be diffused uniformly from the surface of the steel to the interior without passing through the grain boundaries of what was initially an austenitic phase.

One can also see from FIG. 4 that in the test piece subjected to gas carburization, reticular carbides were precipitated along grain boundaries and there was no precipitation or dispersion of uniform and fine grained carbides. This may be explained as follows: in gas carburization, the Cr carbide layer present on the surface of the steel being carburized interfered with the progress of carburization and C was mainly diffused inwardly from the comparatively thin grain boundary portions of the Cr oxide layer, whereby carbides were precipitated along grain boundaries of what was initially an austenitic phase.

It has heretofore been held that when a low-carbon high-chromium steel having the chemical composition shown in FIG. 1 is subjected to gas carburization, reticular carbides will form since no nuclear carbides are present at the carburization temperature (Unexamined Published Japanese Patent Application No. 55565/1981). However, as demonstrated in Example 1, the formation of reticular carbides is due to the interference of carburization by the sturdy Cr oxide layer present on the surface of the steel. It should also be noted that if the concentration of C in the steel increases to such a level that carbides are present even at the carburization temperature, the Cr concentration of the matrix and, hence, the amount of the surface Cr oxide will decrease; however, it is difficult under this situation to form a uniform and fine-grained carburized layer.

As will be understood from the foregoing discussion, plasma-assisted carburization can yield a uniform and fine-grained carbide layer, thereby achieving satisfactory precipitation hardening of the retained austenitic phase.

EXAMPLE 2

Bars (65 mm$\phi$) made of steels (steel sample Nos. 1 and 2) having the chemical compositions shown in FIGS. 1 and 2 were cut at right angles with respect to the rolling direction, thereby preparing disk-shaped test pieces 6.2 mm thick. The steel of the chemical composition shown in Table 2 was SCr 420 commonly used as a carburizing steel.

TABLE 2

| Steel No. | Chemical Composition (wt %) | | | | | | | |
| --- | --- | --- | --- | --- | --- | --- | --- | --- |
| | C | Si | Mn | P | S | Cr | Mo | O |
| 2 | 0.21 | 0.24 | 0.73 | 0.014 | 0.007 | 1.05 | 0.01 | 0.0008 |

The test piece having the chemical composition shown in Table 1 was subjected to plasma-assisted carburization or gas carburization as in Example 1. The test piece having the chemical composition shown in Table 2 was subjected to gas carburization as in Example 1. All of the thus carburized test pieces were quenched and tempered at low temperature. The quenching temperature was so adjusted that the amount of surface retained austenite in the test pieces (at a position 0.1 mm deep from the surface) would vary at about 10%, 20%, 30%, 40% and 50%. Then, both surfaces of each test piece were polished to a depth of 0.1 mm per side and they were further lapped. In this way, test pieces (Nos. a–o) having a thickness of 6.0 mm and a surface roughness of no more than 0.01 Ra were prepared. Various measured parameters of those test pieces, i.e., the amount of surface retained austenite (vol %), the surface carbon content (wt %), the surface hardness (HRC) and the relative surface carbide area (%), are listed in Table 3.

Subsequently, test piece Nos. a–o were subjected to a life test with a thrust testing machine of the type described in "Tokushuko Binran (Handbook of Specialty Steels)", First Edition, compiled by Denki Seiko Kenkyusho, published by Rikogakusha, May 25, 1965, pp. 10-21. The testing conditions were as follows:

Maximum contact areal pressure (Pmax): 578 kg/mm$^2$

| Stress repetition speed: | 3,000 c.p.m. |
|---|---|
| Lubricating oil: VG 68 | Turbine oil |

Figure 5:
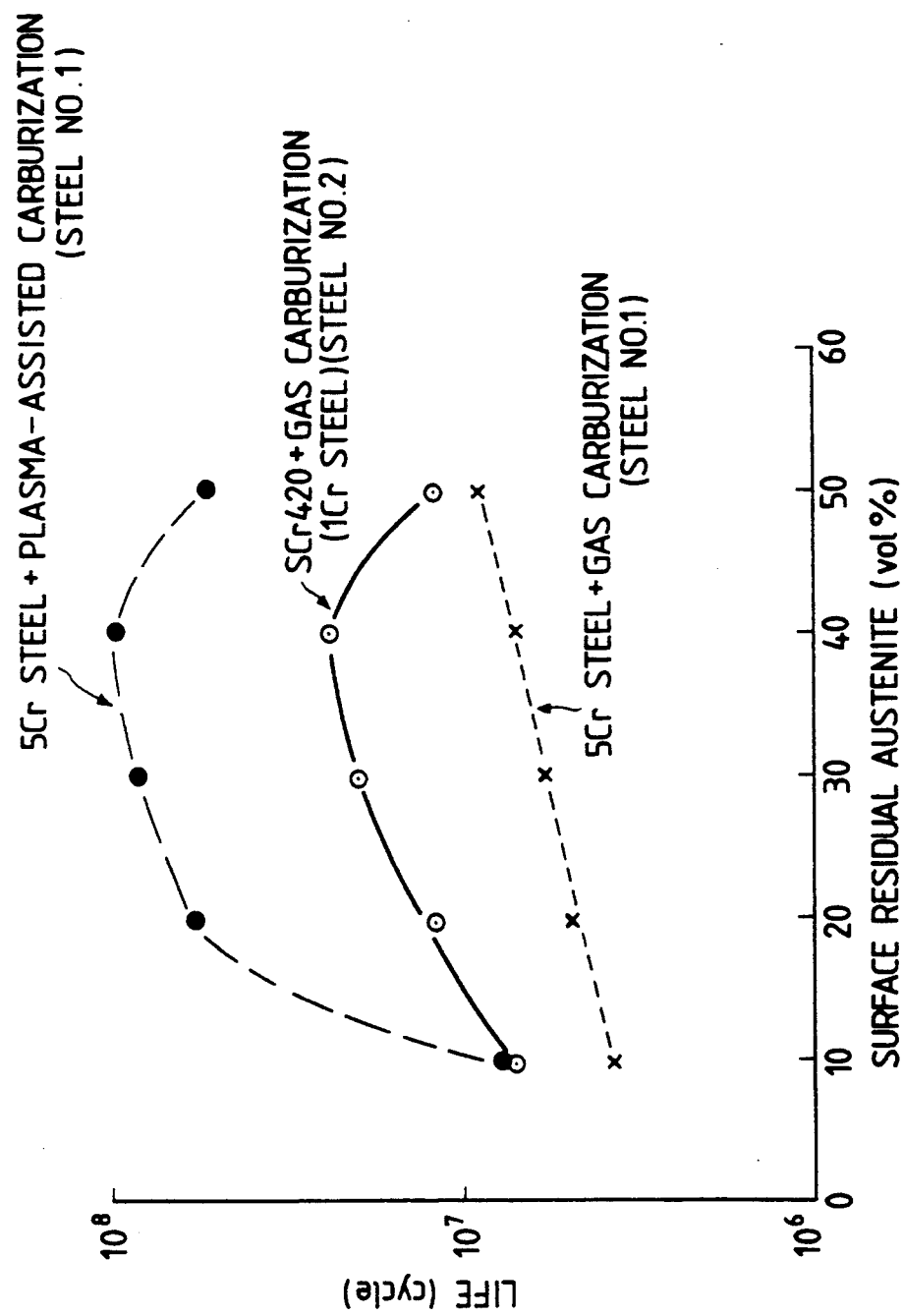
FIG. 5 is a graph showing the relationship between the $L_{10}$ life and the content of surface retained austenite as observed with the samples treated in Example 2 of the present invention.

Each test piece was considered to have reached the end of its life when flaking or cracking discernible with either the naked eye or a magnifier developed. The quantitative expression of the life ($L_{10}$) is equivalent to the cumulative number of revolutions (cycles) up to the point of time when 10% of the test pieces of each sample came to the end of their life. The results of the life test are shown in Table 3, and the relationship between $L_{10}$ and the surface retained austenite content for each test piece is shown in FIG. 5.

prepared by performing gas carburization on the high-Cr steel (steel No. 1) had shorter lives than the test pieces prepared by performing gas carburization on SCr 420 (steel No. 2).

It was thus verified that when test pieces made of a steel containing 3.0-18.0 wt % of Cr, 0.01-1.5 wt % of Si, 0.1-1.2 wt % of C, 0.3-1.5 wt % of Mn, up to 2.5 wt % of Mo, up to 0.002 wt % of $O_2$ and up to 0.015 wt % of S were subjected to plasma-assisted carburization until the amount of surface esidual austenite was within the range of 2-45 vol %, a marked improvement in life could be attained.

EXAMPLE 3

Steels (steel Nos. 2-6) having the chemical compositions shown in Table 4 were cut by the same method as in Example 2 to prepare disk-shaped test pieces having a diameter of 65 mm and a thickness of 6.2 mm. Those test pieces were subjected to plasma-assisted caburization or gas carburization as in Example 1. In plasma-assisted carburization, the $C_3H_8$ to $H_2$ flow ratio and the plasma output were adjusted properly, followed by a

TABLE 3

| Test piece No. | Steel No. | Method of carburization | Surface retained austenite (vol %) | Surface carbon concentration (wt %) | Surface hardness (HRC) | Relative surface carbide area (%) | $L_{10}$ life (cycle) | Remarks |
|---|---|---|---|---|---|---|---|---|
| a | 1 | gas carburization | 10.0 | 1.68 | 61.8 | 20 | $3.7 \times 10^6$ | comparison |
| b | 1 | gas carburization | 20.1 | 1.68 | 62.2 | 20 | $4.9 \times 10^6$ | " |
| c | 1 | gas carburization | 30.1 | 1.68 | 62.8 | 20 | $6.0 \times 10^6$ | " |
| d | 1 | gas carburization | 40.0 | 1.68 | 61.5 | 20 | $7.0 \times 10^6$ | " |
| e | 1 | gas carburization | 50.1 | 1.68 | 58.4 | 20 | $8.9 \times 10^6$ | " |
| f | 1 | plasma-assisted carburization | 9.9 | 2.05 | 61.9 | 25 | $7.6 \times 10^6$ | " |
| g | 1 | plasma-assisted carburization | 20.0 | 2.05 | 62.2 | 25 | $5.8 \times 10^7$ | invention |
| h | 1 | plasma-assisted carburization | 29.9 | 2.05 | 62.7 | 25 | $8.2 \times 10^7$ | " |
| i | 1 | plasma-assisted carburization | 40.1 | 2.05 | 61.5 | 25 | $9.5 \times 10^7$ | " |
| j | 1 | plasma-assisted carburization | 49.8 | 2.05 | 59.1 | 25 | $5.2 \times 10^7$ | comparison |
| k | 2 | gas carburization | 9.9 | 0.99 | 61.2 | 3 | $6.2 \times 10^6$ | " |
| l | 2 | gas carburization | 20.1 | 0.99 | 62.0 | 3 | $1.2 \times 10^7$ | " |
| m | 2 | gas carburization | 29.8 | 0.99 | 62.2 | 3 | $2.0 \times 10^7$ | " |
| n | 2 | gas carburization | 39.7 | 0.99 | 60.8 | 3 | $2.4 \times 10^7$ | " |
| o | 2 | gas carburization | 49.5 | 0.99 | 56.4 | 3 | $1.2 \times 10^7$ | " |

Table 3 and FIG. 5 show that test piece Nos. g, h and i which ranged from 20 to 45 vol % in the amount of surface retained austenite and which were prepared by performing plasma-assisted carburization on the high-Cr steel (steel No. 1) had longer lives than the other test pieces. When the amount of surface retained austenite was less than 20 vol %, no improvement in life could be achieved even when the high-Cr steel (steel No. 1) was subjected to plasma-assisted carburization as evidenced by test piece No. f. It was also found that irrespective of the amount of surface retained austenite, the test pieces diffusion treatment, so that the surface carbon concentration of the test pieces (at a position 0.1 mm deep from the surface) would vary at about 1.0%, 1.6% and 3.0%. In gas carburization, the C potential of the atmosphere was so adjusted that the surface carbon concentration of the test pieces would vary at about 1.0% and 1.6%. Thereafter, all test pieces were quenched and tempered at low temperature. The quenching temperature was so adjusted that the amount of surface retained austenite would be about 30 vol %.

TABLE 4

| Steel No. | Chemical Composition (wt %) | | | | | | | |
|---|---|---|---|---|---|---|---|---|
| | C | Si | Mn | P | S | Cr | Mo | O |
| 2 | 0.21 | 0.24 | 0.73 | 0.014 | 0.007 | 1.05 | 0.01 | 0.0008 |
| 3 | 0.20 | 0.25 | 0.71 | 0.0013 | 0.006 | 2.04 | 0.01 | 0.0009 |
| 4 | 0.20 | 0.24 | 0.72 | 0.0011 | 0.004 | 3.01 | 0.01 | 0.0010 |
| 5 | 0.21 | 0.25 | 0.74 | 0.0013 | 0.005 | 10.03 | 0.01 | 0.0013 |
| 6 | 0.52 | 0.25 | 0.70 | 0.0011 | 0.006 | 17.50 | 0.01 | 0.0015 |

In the next step, both surfaces of each test piece were polished to a depth of 0.1 mm per side and they were further lapped. In this way, test pieces (Nos. m–m10 and Nos. p1–p15) having a thickness of 6.0 mm and a surface roughness of no more than 0.01 Ra were prepared. Various measured parameters of those test pieces, i.e., the amount of surface retained austenite (vol %), the surface carbon concentration (wt %), the surface roughness (HRC) and the relative surface carbide area (%), are listed in Table 5.

Subsequently, test piece Nos. m–m10 and Nos. p1–p15 were subjected to a life test under the same conditions as in Example 2. The results of the life test are shown in Table 5, and the relationship between $L_{10}$ and the Cr concentration for each test piece is shown in FIG. 6.

TABLE 5

| Test piece No. | Steel No. | Method of carburization | Surface retained austenite (vol %) | Surface carbon concentration (wt %) | Surface hardness (HRC) | Relative surface carbide area (%) | $L_{10}$ life (cycle) | Remarks |
|---|---|---|---|---|---|---|---|---|
| m | 2 | gas carburization | 29.8 | 0.99 | 62.2 | 3 | $2.0 \times 10^7$ | comparison |
| m2 | 2 | " | 30.1 | 1.61 | 62.3 | 13 | $8.7 \times 10^6$ | " |
| p1 | 2 | plasma-assisted carburization | 29.6 | 1.00 | 62.1 | 3 | $2.0 \times 10^6$ | " |
| p2 | 2 | " | 29.9 | 1.62 | 62.4 | 13 | $9.1 \times 10^6$ | " |
| p3 | 2 | " | 30.3 | 2.95 | 62.8 | 34 | $3.2 \times 10^6$ | " |
| m3 | 3 | gas carburization | 29.8 | 0.99 | 62.4 | 6 | $2.2 \times 10^7$ | " |
| m4 | 3 | " | 30.3 | 1.62 | 63.2 | 16 | $2.3 \times 10^7$ | " |
| p4 | 3 | plasma-assisted carburization | 30.0 | 1.01 | 62.1 | 6 | $2.2 \times 10^7$ | " |
| p5 | 3 | " | 30.3 | 1.64 | 63.1 | 16 | $2.4 \times 10^7$ | |
| p6 | 3 | " | 29.7 | 3.01 | 63.3 | 37 | $2.6 \times 10^7$ | " |
| m5 | 4 | gas carburization | 30.1 | 0.98 | 62.7 | 7 | $1.6 \times 10^7$ | " |
| m6 | 4 | " | 29.5 | 1.63 | 63.4 | 17 | $1.0 \times 10^7$ | " |
| p7 | 4 | plasma-assisted carburization | 29.9 | 1.02 | 62.4 | 7 | $2.3 \times 10^7$ | " |
| p8 | 4 | " | 29.7 | 1.60 | 63.3 | 16 | $4.0 \times 10^7$ | invention |
| p9 | 4 | " | 29.9 | 2.99 | 63.5 | 38 | $7.2 \times 10^7$ | " |
| m7 | 5 | gas carburization | 30.0 | 1.00 | 62.5 | 12 | $6.3 \times 10^6$ | comparison |
| m8 | 5 | " | 30.1 | 1.62 | 63.4 | 21 | $2.5 \times 10^6$ | " |
| p10 | 5 | plasma-assisted carburization | 29.5 | 0.95 | 62.8 | 11 | $2.3 \times 10^7$ | comparison |
| p11 | 5 | " | 30.3 | 1.61 | 63.7 | 21 | $1.4 \times 10^8$ | invention |
| p12 | 5 | " | 30.1 | 3.03 | 63.9 | 41 | $2.6 \text{ '}3 10^8$ | " |
| m9 | 6 | gas carburization | 30.0 | 0.95 | 61.8 | 10 | $2.8 \times 10^6$ | comparison |
| m10 | 6 | " | 29.8 | 1.61 | 62.6 | 20 | $1.0 \times 10^6$ | " |
| p13 | 6 | plasma-assisted carburization | 30.2 | 0.98 | 62.4 | 10 | $2.4 \times 10^7$ | " |
| p14 | 6 | " | 30.4 | 1.60 | 63.5 | 19 | $2.0 \times 10^8$ | invention |
| p15 | 6 | " | 30.0 | 2.99 | 63.8 | 40 | $4.2 \times 10^8$ | " |

Figure 6:
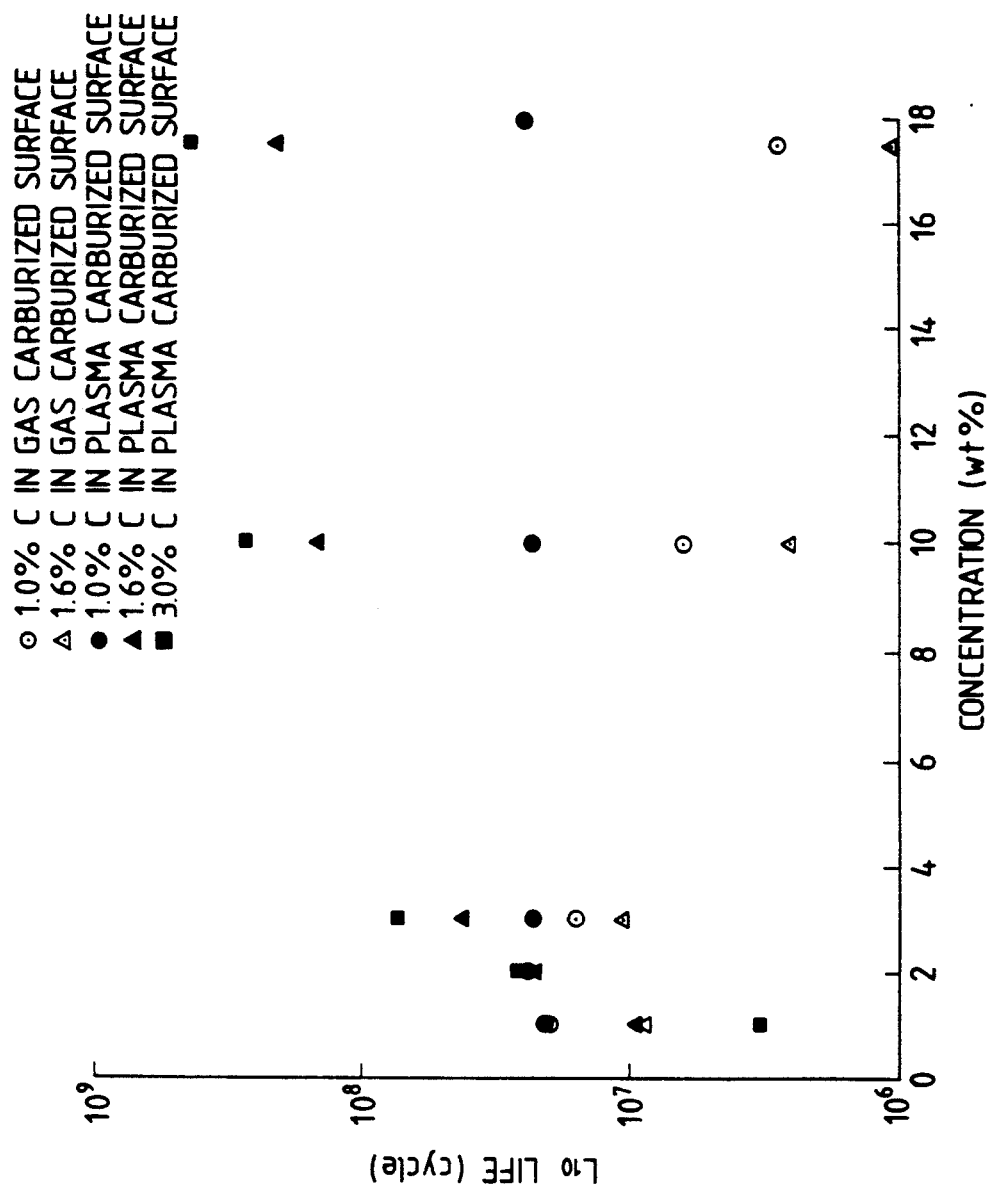
FIG. 6 is a graph showing the relationship between the $L_{10}$ life and the Cr concentration as observed with the samples treated in Example 3 of the present invention.

Table 5 and FIG. 6 show that test piece Nos. p8, p9, p11, p12, p14 and p15 which were prepared by performing plasma-assisted carburization on steels containing at least 3.0 wt % of Cr and which had surface carbon concentrations of at least 1.6% had longer lives than the other test pieces, which were at least twice as long as the life of currently used SCr 420 (test piece No. m).

The test pieces the surface carbon concentration of which was less than 1.6% were incapable of achieving the relative surface carbide area at 15% and above, which values are necessary in order to precipitation harden the retained austenite.

The test pieces having the higher surface carbon concentrations were found to be longer lived than the test pieces having the lower values. However, when carburization was performed to such an extent that the surface carbon concentration exceeded 3.5%, the furnace bed experienced heavy sooting to lower the productivity of the carburization process.

It was also found that irrespective of the method of carburization adopted (plasma-assisted carburization or gas carburization), the life of the test pieces having a Cr concentration of 1 wt % (Nos. m, m2, p1, p2 and p3) became shorter as the surface carbon concentration increased. This is due to the formation of coarser carbides.

It was thus verified that the test pieces carburized to have a relative surface carbide area of at least 15% and a surface carbon concentration of 1.6–3.5% were improved in life.

EXAMPLE 4

Steels (steel Nos. 7 and 8) having the chemical compositions shown in Table 6 were cut by the same method as in Example 2 to prepare disk-shaped test pieces having a diameter of 65 mm and a thickness of 6.2 mm. Those test pieces were subjected to plasma-assisted carburization or gas carburization as in Example 1. Thereafter, all test pieces were quenched and tempered at low temperature. By applying the same method as used in Example 3, all test pieces were adjusted to have a surface carbon concentration of about 2.9 and a surface retained austenite content of about 35 vol %.

TABLE 6

| Steel No. | Chemical Composition (wt %) | | | | | | | |
|---|---|---|---|---|---|---|---|---|
| | C | Si | Mn | P | S | Cr | Mo | O |
| 7 | 0.41 | 0.25 | 0.71 | 0.012 | 0.007 | 13.10 | 0.01 | 0.0012 |
| 8 | 0.66 | 0.24 | 0.70 | 0.011 | 0.005 | 13.02 | 0.01 | 0.0012 |

In the next step, both surfaces of each test piece were polished to a depth of 0.1 mm per side and they were further lapped. In this way, test pieces (Nos. q1–q3) having a thickness of 6.0 mm and a surface roughness of no more than 0.01 Ra were prepared. Various measured parameters of those test pieces, i.e., the amount of retained austenite (vol %), the surface carbon concentration (wt %), the hardness (HRC) and the relative carbide area (%), are listed in Table 7.

Subsequently, test piece Nos. q1-q3 were subjected to a life test under the same conditions as in Example 2. The results of the life test are shown in Table 7 below.

deep from the surface, thereby improving the rolling fatigue life of bearing.

EXAMPLE 5

A steel (steel No. 9) having the chemical composition shown in Table 8 was cut by the same method as in Example 2 to prepare thick-walled test pieces having a diameter of 65 mm and a thickness of 6.2 mm. Those test

TABLE 7

| Test piece No. | Steel No. | Carburization Method | Temp (°C.) | Time (h) | Retained austenite Surface (vol %) | Retained austenite 0.19 mm deep (vol %) | Hardness Surface (HRC) | Hardness 0.38 mm deep (HRC) | Relative carbide area Surface (%) | Relative carbide area 0.19 mm deep (%) | Surface carbon concentration (wt %) | $L_{10}$ life (cycle) | Remarks |
|---|---|---|---|---|---|---|---|---|---|---|---|---|---|
| q1 | 7 | plasma-assisted carburization | 9.30 | 8.5 | 35.0 | 36.2 | 62.2 | 61.4 | 40 | 38 | 2.90 | $4.6 \times 10^9$ | invention |
| q2 | 7 | gas carburization | 9.30 | 8.5 | 35.1 | 12.4 | 62.1 | 50.4 | 40 | 8 | 2.89 | $2.0 \times 10^8$ | comparison |
| q3 | 8 | gas carburization | 9.30 | 8.5 | 35.4 | 20.8 | 62.4 | 59.2 | 40 | 16 | 2.91 | $5.2 \times 10^8$ | comparison |

As one can see from Table 7, test piece No. q1 which was subjected to plasma-assisted carburization had a by far higher level of retained austenite than the gas-carburized test pieces (Nos. q2 and q3) in a position 0.19 mm deep from the surface; at the same time, test piece No. q1 had a longer life than Nos. q2 and q3. The position 0.19 mm deep from the surface corresponds to 2% of the diameter of rolling elements in the case where a maximum shear stress due to rolling contact will develop at the largest depth. In other words, test piece No. q1 having a high retained austenite content in that position can have a satisfactory fatigue life under rolling.

Test piece No. q1 also was very hard at a position 0.38 mm deep from the surface as compared to the other test pieces. That position 0.38 mm deep from the surface is shallower than the area where a substantial shear stress due to rolling contact will act, or the area which corresponds to 4% of the diameter of rolling elements. In other words, test piece No. q1 having high hardness in that position can have a satisfactory fatigue life under rolling.

To increase the thickness of a carburization-hardened layer, steel No. 8 having the higher C concentration was subjected to gas carburization (test piece No. q3) and this test piece had a longer life than test piece No. q2 which was prepared by gas carburizing steel No. 7 of the lower C concentration. Yet, the life of test piece No. q3 was shorter than that of SCr 420.

It was thus verified that plasma-assisted carburization was effective in increasing not only the amount of retained austenite at the position 0.19 mm deep from the surface but also the hardness at the position 0.38 mm pieces were subjected to plasma-assisted carburization or gas carburization as in Example 1. Thereafter, all test pieces were quenched and tempered at low temperature. The quenching temperature was so adjusted that the amount of surface retained austenite would vary at ca. 10 vol %, 20 vol %, 30 vol %, 40 vol % and 50 vol %.

TABLE 8

| Steel No. | Chemical Composition (wt %) | | | | | | | |
|---|---|---|---|---|---|---|---|---|
| | C | Si | Mn | P | S | Cr | Mo | O |
| 9 | 0.15 | 0.23 | 0.77 | 0.010 | 0.004 | 5.00 | 1.01 | 0.0013 |

In the next step, both surfaces of each test piece were polished to a depth of 0.1 mm per side and they were further lapped. In this way, test pieces (Nos. r1-r5) having a thickness of 6.0 mm and a surface roughness of no more than 0.01 Ra were prepared. Various measured parameters of those test pieces, i.e., the amount of surface retained austenite (vol %), the surface carbon concentration (wt %), the surface hardness (HRC) and the relative surface carbide area (%), are listed in Table 9.

TABLE 9

| Test piece No. | Steel No. | Method carburization | Surface retained austenite (vol %) | Surface carbon concentraion (wt %) | Surface hardness (HRC) | Relative surface carbon area (%) | Remarks |
|---|---|---|---|---|---|---|---|
| r1 | 9 | plasma-assisted carburization | 9.8 | 2.16 | 61.9 | 27 | comparison |
| r2 | 9 | " | 20.4 | 2.16 | 62.3 | 27 | invention |
| r3 | 9 | " | 30.4 | 2.16 | 62.9 | 27 | " |
| r4 | 9 | " | 40.0 | 2.16 | 61.7 | 27 | " |
| r5 | 9 | " | 50.2 | 2.16 | 59.5 | 27 | comparison |

Figure 7:
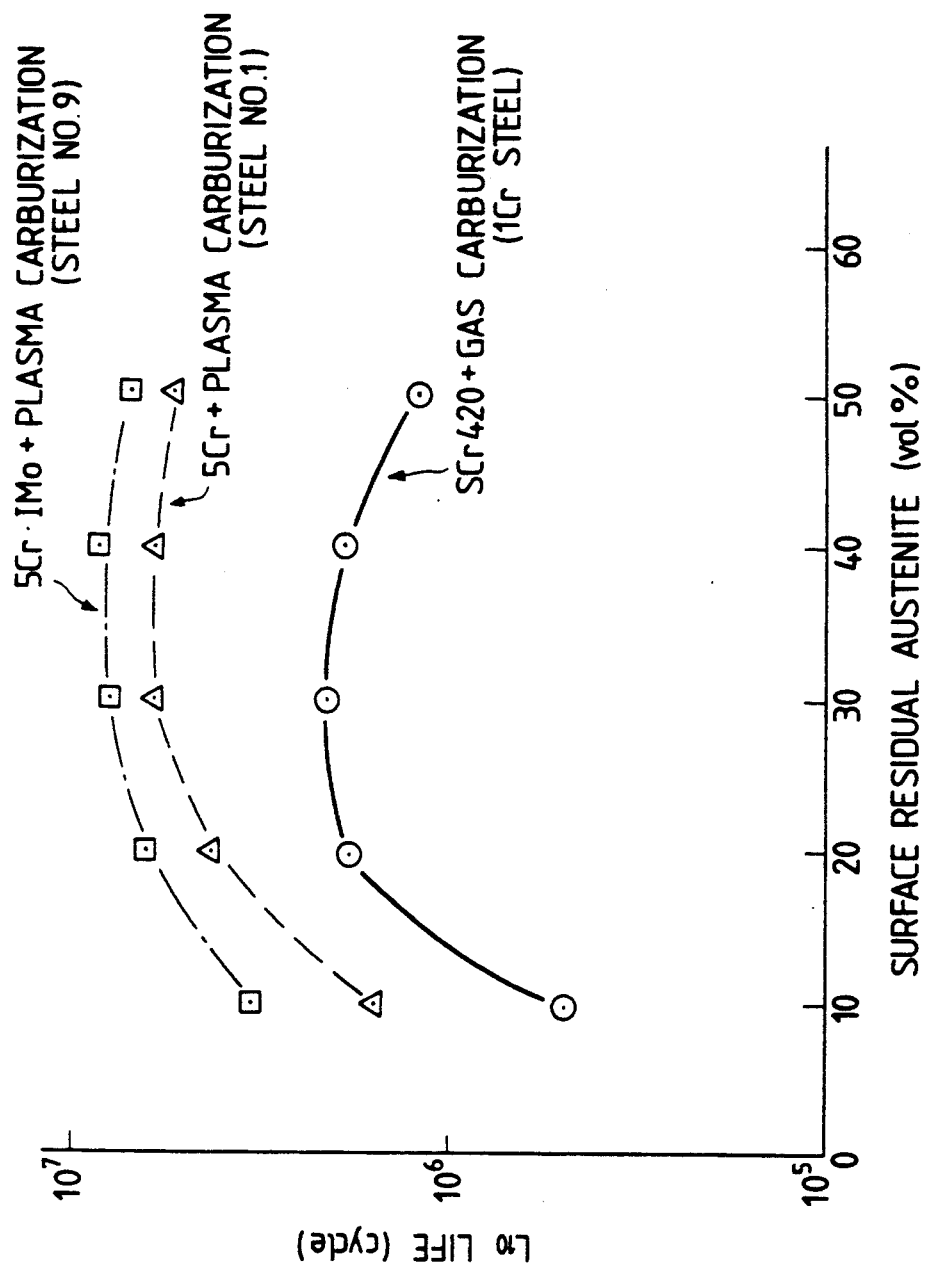
FIG. 7 is a graph showing the relationship between the $L_{10}$ life and the content of surface retained austenite as observed with the samples treated in Example 5 of the present invention.
Figure 8:
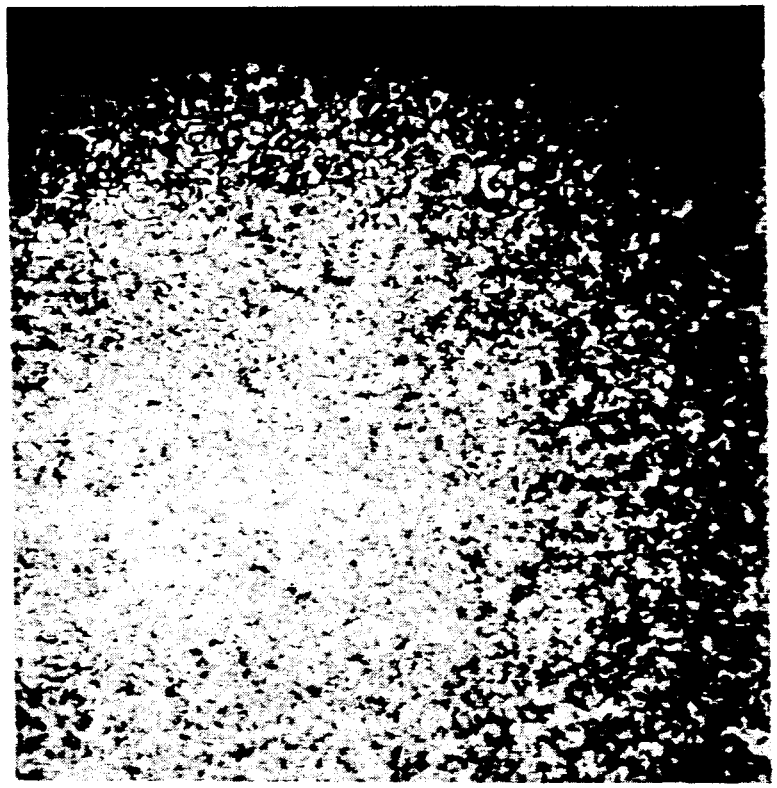
FIG. 8 is a photo showing the microscopic structure of test piece No. r2 treated in Example 5 of the present invention.

Test piece Nos. r1-r5, as well as part of the test pieces prepared in Example 2 (Nos. f-o) were subjected to a life test under the conditions set forth below in the presence of foreign matter using a thrust testing machine of the same type as used in Example 2. The test results are shown in Table 10; the relationship between the $L_{10}$ life and the amount of surface retained austenite is shown in FIG. 7; and FIG. 8 is a photo showing the microscopic structure of test piece No. r2 containing Mo.

| | |
|---|---|
| Maximum contact areal pressure (Pmax): | 500 kgf/mm² |
| Stress repetition rate: | 3,000 c.p.m. |
| Lubricating oil: VG 68 | Turbine oil |
| Foreign matter, | |
| Hardness: | Hv 870 |
| Size: | 74–147 μm |
| Quantity: | 300 ppm |

TABLE 10

| Test piece No. | L₁₀ life (cycles) | Remarks |
|---|---|---|
| r1 | 3.3 × 10⁶ | Comparison |
| r2 | 6.3 × 10⁶ | Invention |
| r3 | 7.9 × 10⁶ | " |
| r4 | 8.3 × 10⁶ | " |
| r5 | 6.9 × 10⁶ | Comparison |
| f | 1.6 × 10⁶ | " |
| g | 4.4 × 10⁶ | Invention |
| h | 6.0 × 10⁶ | " |
| i | 6.0 × 10⁶ | " |
| j | 5.2 × 10⁶ | Comparison |
| k | 5.0 × 10⁶ | " |
| l | 1.4 × 10⁶ | " |
| m | 2.1 × 10⁶ | " |
| n | 1.9 × 10⁷ | " |
| o | 1.2 × 10⁶ | " |

As one can see from Table 10 and FIG. 7, the test pieces (Nos. g–i and Nos. r2–r4) which were prepared by performing plasma-assisted carburization on high-Cr steels and which had surface retained austenite levels in the range of 20–45 vol % were longer-lived than the other test pieces even in the presence of foreign matter. It was also apparent that test piece Nos. r2–r4 which were prepared by performing plasma-assisted carburization on the Mo-containing high-Cr steel (steel No. 9) and which had surface retained austenite levels in the range of 20–45 vol % had even longer lives than the other test pieces.

Compared to the test pieces not containing Mo, those containing Mo had higher levels of surface carbon concentration and larger values of relative surface carbide area. One can also see from FIG. 8 that the Mo-containing test pieces were characterized by a precipitation and dispersion of uniform and fine-grained carbides.

Steel No. 9 contained Mo in an amount of 1.01 wt %, which was more than 5/100 of the Cr concentration (5.00 wt %).

It was thus verified that the addition of Mo was highly effective in extending the life of bearing steels.

As described on the foregoing pages, the elements to be contained in the alloy steel to be carburized for making at least one of an inner race, an outer race and rolling elements, as well as their concentrations (or contents) are limited in the present invention; further, said alloy steel is subjected to plasma-assisted carburization; in addition, the surface carbon concentration, the relative surface carbide area and the content of surface retained austenite are limited as set forth hereinabove; if these conditions are met, uniform and fine-grained carbides can be precipitated in the retained austenitic phase. Hence, the retained austenitic phase can be precipitation hardened, whereby the ability of the retained austenitic phase to lessen stress concentration is retained and yet its resistance to crack propagation and fatigue can be improved. As a consequence, the present invention provides a ball-and-roller bearing that can work effectively for a prolonged lifetime even if it is placed under hostile conditions as exemplified by an increased areal pressure of load and entrance of foreign matter into lubricating oils.

What is claimed is:

1. A ball or roller bearing comprising an inner race, an outer race and rolling elements, at least one of said inner race, said outer race and said rolling elements being made of an alloy steel that consists of 0.1–1.2 wt % of carbon, 3.0–18.0 wt % of chromium, 0.01–1.5 wt % of silicon, 0.3–1.5 wt % of manganese, up to 2.5 wt % of molybdenum, up to 0.002 wt % of oxygen, up to 0.015 wt % of sulfur and the balance being iron and incidental impurities, at least one of said inner race, said outer race and said rolling elements being subjected to plasma-assisted carburization and hardened to such an extent that it has a relative surface carbon area of 15–45%, a surface carbon concentration of 1.6–3.5 wt % and a surface retained austenite level $[\gamma_R]_{sur}$ of 20–45 vol %.

2. A ball or roller bearing according to claim 1, in which Mo concentration is preferably set to lie within the range of from (5/100 of the Cr concentration) wt % to 2.5 wt %.

3. A ball or roller bearing according to claim 2, in which said carburized alloy steel has a Rockwell hardness (HRC) of at least 58 in a position that corresponds to 4% of a diameter of rolling elements as measured from a rolling contact surface.

4. A ball or roller bearing according to claim 2, in which said carburized alloy steel has said relative surface carbon area of 15–45%, said surface carbon concentration of 1.6–3.5 wt % and said surface retained austenite level $[\gamma_R]_{sur}$ of 20–45 vol % in a position that corresponds to 2% of a diameter of rolling elements as measured from a rolling contact surface.

5. A ball or roller bearing according to claim 1, in which said carburized alloy steel has a Rockwell hardness (HRC) of at least 58 in a position that corresponds to 4% of a diameter of rolling elements as measured from a rolling contact surface.

6. A ball or roller bearing according to claim 1, in which said carburized alloy steel has said relative surface carbon area of 15–45%, said surface carbon concentration of 1.6–3.5 wt % and said surface retained austenite level $[\gamma_R]_{sur}$ of 20–45 vol % in a position that corresponds to 2% of a diameter of rolling elements as measured from a rolling contact surface.

* * * * *